(12) United States Patent
Kolb et al.

(10) Patent No.: US 7,671,569 B2
(45) Date of Patent: Mar. 2, 2010

(54) ARRANGEMENT AND METHOD FOR MONITORING AND CONTROLLING A PLURALITY OF SERIES-CONNECTED CAPACITORS

(75) Inventors: Tobias Kolb, Nürenberg (DE); Jens Jordan, Nürnberg (DE)

(73) Assignee: Diehl Luftfahrt Elekronik GmbH, Nürnberg (DE)

( * ) Notice: Subject to any disclaimer, the term of this patent is extended or adjusted under 35 U.S.C. 154(b) by 684 days.

(21) Appl. No.: 11/437,155

(22) Filed: May 19, 2006

(65) Prior Publication Data

US 2006/0261784 A1    Nov. 23, 2006

(30) Foreign Application Priority Data

May 21, 2005   (DE)   ........................ 10 2005 023 486
Jul. 9, 2005   (DE)   ................... 20 2005 010 858 U

(51) Int. Cl.
*H02J 7/00* (2006.01)
(52) U.S. Cl. ....................... 320/166; 320/167
(58) Field of Classification Search ................. 320/166, 320/167
See application file for complete search history.

(56) References Cited

U.S. PATENT DOCUMENTS

| | | | |
|---|---|---|---|
| 5,894,212 A | 4/1999 | Balogh | |
| 6,046,514 A | 4/2000 | Rouillard et al. | |
| 6,225,781 B1 * | 5/2001 | Okamura et al. | ............ 320/166 |
| 6,316,917 B1 * | 11/2001 | Ohta | ........................ 320/166 |
| 6,664,766 B2 * | 12/2003 | Desprez et al. | ............. 320/167 |
| 6,809,433 B2 | 10/2004 | Nozu | |
| 6,809,502 B2 * | 10/2004 | Tsujii et al. | ................. 320/166 |

FOREIGN PATENT DOCUMENTS

| | | |
|---|---|---|
| DE | 197 05 192 A1 | 2/1997 |
| EP | 1 406 143 A2 | 4/2004 |

\* cited by examiner

*Primary Examiner*—Bao Q Vu
*Assistant Examiner*—Jue Zhang
(74) *Attorney, Agent, or Firm*—Scully, Scott, Murphy & Presser, P.C.

(57) ABSTRACT

A method for monitoring and controlling a plurality of series-connected capacitance, wherein at least during the discharge of the capacitances, there is determined a voltage of every capacitance, and in the instance of a drop-off of a voltage of one of the capacitances below a first threshold voltage of this capacitance, the capacitance is bridged over to at least the end of the discharge. Also provided are devices for determining every voltage of every capacitance, devices for symmetrizing voltages among the capacitances, and devices for the deactivation of at least one of the capacitances.

5 Claims, 3 Drawing Sheets

ARRANGEMENT AND METHOD FOR MONITORING AND CONTROLLING A PLURALITY OF SERIES-CONNECTED CAPACITORS

BACKGROUND OF THE INVENTION

1. Field of the Invention

The present invention relates to an arrangement and to a method for monitoring and controlling a plurality of capacitances, which are connected in series.

2. Discussion of the Prior Art

A method for symmetrizing or balancing the condensers or capacitors of a condenser battery and a possible arrangement for that purpose are disclosed in European Patent Publication EP 1 406 143 A2. The condenser battery consists of a plurality of parallel-connected rows of presently individual condensers, which can be the so-called ultra-condensers. In order to be able to store the greatest possible amount of energy in such a condenser battery, it is important to uniformly charge all condensers of the battery; in effect, to charge uniformly and fully. This process is referred to as "symmetrizing", or essentially balancing. In the event that there is applied to individual condensers, even if only for a short period of time, a condenser voltage which is in excess of a rated value, this will lead to a more rapid aging of this condenser. In an extreme case, this condenser must then be prematurely removed, which is complicated procedure.

Differing voltages which are applied to the individual condensers or capacitors which render the energy storage device inefficient, can be essentially traced back to the condenser properties; for example, to the replacement-series resistance and/or to the capacitance of the condenser. Moreover, parallel resistances can also be significant in that connection.

Accordingly, for this purpose, it becomes necessary to charge each individual condenser of a condenser battery to an upper voltage limit, and to protect it from an overload, which can lead to a destruction of the condenser. At an excessively high applied voltage, this can lead to a blowing-off of the electrolytes, which signifies a destruction of the condenser. However, by means of a diagnosis, it should be possible to early recognize as to whether a condenser is not capable of being fully operationally capable.

In the disclosure of EP 1 406 143 A2, for a monitoring of the charge condition of the condensers, there are prepared three voltage levels by means of a reference voltage source. At every condenser there is determined the condenser voltage and compared with the voltage levels. A correct charge of a condenser is indicated when the condenser voltage lies between the two lower voltage levels. A disorder of the condenser is indicated when the condenser voltage is greater than the highest voltage level. It is then only symmetrized or balanced when neither a correct charge nor a disorder is indicated. Through the intermediary of a bus system, there can, however, an evaluating unit can also be informed with regard to the error, so as to facilitate an immediate diagnosis of the failed condenser.

Similarly, EP 1 406 143 A2 discloses an arrangement, in which arranged in parallel with respectively two or more of the condensers of the condenser battery is a series circuit consisting of an ohmic resistance and a first transistor. Connected in parallel with the first transistor is at least one further transistor. The transistors are connected with an evaluating unit, whereby voltage tap-offs from the condensers are connected with the evaluating unit. The ohmic resistance of the series circuit, which is necessary for the symmetrizing serves as a discharge resistor, and, for example, can be a large wire-wound resistance. It can also have or also be a flat-bottom or surface resistance, an HSA resistance, or also a cement resistance. The transistors are, as a rule, so-called field-effect transistors. If required, upon occasion these field-effect resistors can be equipped with cooling elements.

SUMMARY OF THE INVENTION

Accordingly, the invention has as an object, to provision of an especially suitable method and a particularly suitable arrangement for the monitoring or controlling of a series circuit of capacitances, especially during the charging cycle or the discharge cycle.

Hereinbelow, there is thus disclosed a method for the monitoring and control of capacitances, which are connected in series, during the charging, the discharging or in the presence of an essentially constant charge. Pursuant to this method, during the discharge of the capacitances there is determined a voltage for every capacitance. For the determination thereof, this voltage can be high-ohmically tapped-off, for example, and converted in an analog-digital mode.

In the instance of a dropping off of a voltage of one of the capacitances below a first threshold voltage, this capacitance is bridged over by means of a switch at least up to the end of the discharging. The threshold voltage can be set, for example, as a digital parameter. The activation of the switch can hereby be, in particular, digitally stored up to discharging so that no renewed measurement is required up to the discharging timepoint.

A particularly advantageous modification of the present invention contemplates that for a symmetrizing or balancing there is detected the dropping off of a voltage of one of the capacitances below a second threshold voltage, so that, in this case, the capacitance with the highest voltage is connected in parallel with a resistance.

A further modification of the invention is provided for the symmetrizing steps, wherein in the instance of the exceeding of a voltage by one of the capacitances above a third threshold voltage, this capacitance has a resistance connected in parallel therewith. This causes the line in the charging cycle to be charged more slowly, or partially discharged through the resistance. The resistance can hereby be formed, for example, by an ohmic resistance or through a correspondingly actuated semiconductor. For different currents provisions can be made for a plurality of different resistances.

An advantageous embodiment of the invention contemplates that the second threshold voltage and/or the third threshold voltage are determined in dependence upon the voltages of all capacitances, especially their voltage sum or a nominal voltage. A nominal voltage can hereby coincide with a preselected line voltage, whereby the line voltage is selected on the basis of previously specified criteria.

A further aspect of the invention resides in the provision of an arrangement where the plurality of capacitances which are connected in series and with a switching circuit which possesses means for determining every voltage for every capacitance, means for symmetrizing or balancing the voltages of the capacitances among each other, and means for the deactivation of at least one of the capacitances. For effectuation of a control, preferably provided as a control unit is a computer unit, especially such as a microcontroller. For the determination of every voltage for every capacitance, there are preferably provided measuring means, which posses a high ohmic input, and which are connected with the terminals of the respective capacitance either directly or through a multiplexer. For a redundancy from a safety technology standpoint, these measuring means can be provided either dually or in multiple.

As a means for symmetrizing the voltages of the capacitances among each other, there are adapted suitable constructional components, such as resistances, inductivities or condensers, which upon being switched in, preferably produce a controlled reduction in the charge of the line, which is to be symmetricated or balanced.

For deactivation there are short-circuited the applicable capacitances. This is especially necessary in the instance of a detected defect in this capacitance. For deactivation, there is preferably provided a switch which is designed for a possibly encountered discharging current.

A preferred modification of this aspect of the invention contemplates that the means for the deactivation possesses a deactivating switch which bridges over the applicable capacitance for deactivation thereof.

In a preferred embodiment of the invention, the deactivating switch is at least a semiconductor component, in particular, a field-effect transistor, whose source connection and drain connection are each directly connected with respectively one terminal of the capacitance. Hereby, for a direct connection, no component is connected between the field-effecter transistor and the capacitance.

The invention, in a further equipping thereof, possesses the means for the deactivating of a level transducer. That type of level transducer, for example, can comprise a magnetically coupled transmitter or charge pump.

Preferably, the means for symmetrizing possesses a resistance, and a symmetrizing switch which is connected in series with the resistance, which are connected in parallel with the applicable capacitance for an active symmetrizing or balancing. Advantageously, the symmetrizing switch is at least one semiconductor component, especially a field-effect transistor. Hereby, its source connection or its drain connection are connected directly with the resistance and not through a further component. Moreover, the means for symmetrizing can advantageously incorporate a level transducer.

In an expedient modification, the switching circuit possesses an integrated control circuit, especially such as a microcontroller, whereby one or more outputs of the integrated control circuit is multiplexable through a multiplexer at each level transducer, which is associated with a capacitance. This facilitates a serial control for the deactivation and/or symmetrizing of the individual capacitances. For a redundancy which is necessary from the standpoint of safety, the multiplexer, the level transducer, as well as the means for deactivating and/or symmetrizing, can be constructed either dually or in multiple for each of the capacitances.

In a preferred embodiment of the invention, the means for determining the voltage comprises a differential amplifier whose two inputs are connected with the terminals of the respective capacitance. Advantageously, one or more outputs of every means are hereby multiplexable through a multiplexer for determining the voltage at one or more inputs of the integrated control circuit.

In a further preferred embodiment of the invention, every capacitance possesses a plurality of parallel-connected condensers, which, in particular, form a condenser matrix. The condensers are advantageously ultra-condensers, which are utilized for an uninterrupted current supply.

BRIEF DESCRIPTION OF THE DRAWINGS

Hereinbelow are elucidated exemplary embodiments of the invention on the basis of the drawings, wherein.

DETAILED DESCRIPTION OF THE INVENTION

Figure 1:
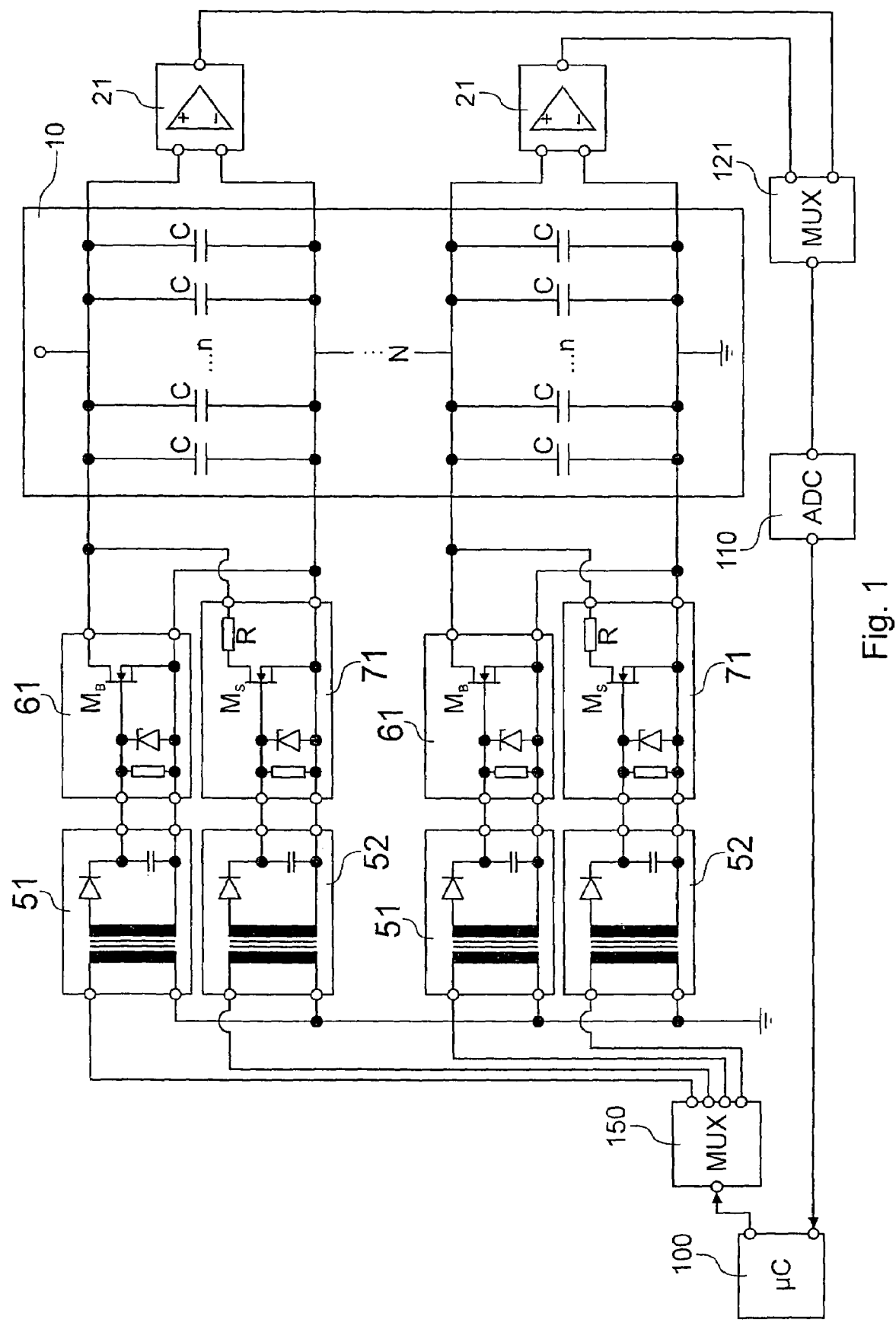
FIG. 1 illustrates a schematic block circuit diagram of an arrangement with a condenser matrix.

The block circuit diagram, which is schematically illustrated in FIG. 1 of the drawings, is utilized in a commercial aircraft for an electrically-operated door system with a central control and an integrated emergency current supply. The energy storage for the emergency current supply is hereby the condenser matrix 10. Herein, the door system consists of a central control unit and a number of doors which are electrically opened and closed, and which are connected with a central computer. The doors provide through local control, sensor and actuator units, as well as through emergency current supply units for electrical opening and closing, as well as for the actuation of emergency slides.

During normal operation, the system is supplied from thereof externally with electrical energy. The central computer communicates with the local control units and monitors all doors. Upon a failure of the central current supply and/or a loss of in a communicating connection between the central computer and local control unit, the doors can still be securely electrically operated, opened and closed due to the selected arrangement in connection with the local emergency current supply.

The control unit is preferably arranged together in a single housing with the emergency current supply. Employed as the energy storage (or battery) is a capacitance storage consisting of a condenser matrix 10. The control unit itself is utilized in order to monitor and regulate its own emergency current supply.

In FIG. 1 the condenser matrix 10 consists of N lines with n parallel-connected condensers C. The lines are, in turn, again connected in series with each other.

For example, presently four condensers C are connected in parallel so that with fourteen lines, there is obtained a 14×4 condenser matrix 10.

The control is effected through a switching circuit which possesses a microcontroller 100. By means of a differential measurement technology 21 which, for example, possesses a differential amplifier, there is amplified every voltage of every line capacitance, and for their determination, through a multiplexer 121 and an analog-digital converter 110, transmitted to the computer unit in the microcontroller 100. Hereby, the analog-digital converter 110 can similarly be an integral constituent of the microcontroller 100.

The microcontroller 100, through a multiplexer 115 and one or more level transducers 51, controls a first field-effect transistor $M_B$ as a constituent of a bypass 61 for a possible deactivation of the associated capacitances C of the line. For this purpose, the field-effect transistor $M_B$ of the bypass 61 bridges over the terminals of the condensers C of the line and thereby short-circuits the capacitances. A symmetrizing or balancing arrangement 71 forming the means for symmetrizing or balancing of the voltages of the capacitances among each other, is controlled by the microcontroller 100 through the multiplexer 150 and one or more level transducers 52 in such a manner, that in case of the need of the capacitances C of the applicable line, by means of a field-effect transistor $M_S$ a resistance R is connected in parallel with the symmetrizing arrangement 71.

The level transducers 51 and 52 are necessary inasmuch as all bypasses 61 and symmetrizing arrangement 71 in the matrix 10 lie at different potentials. Through the activation of one symmetrizing unit 71, the applicable line of the matrix 10 is charged through the resistance R, and thus more slowly charged or, respectively, discharged more than all other matrix lines. When the matrix 10 itself during the symmetrizing process is applied to a constant voltage, then the line voltage of the lines increases whose symmetrizing unit 71 is not active, so that its field-effect transistor $M_S$ blocks. In contrast therewith, the line voltage of the lines with active symmetrizing unit 71 reduces in comparison with the lines with inactive symmetrizing unit 71.

Due to the bypass 61 it becomes possible for the microcontroller 100 to bridge over one line in the energy storage 10 for a short-circuiting thereof and thereby to deactivate. This can be necessary when the microcontroller 100, for example, determines an excessively high self-discharge or a short-circuit in one line. In case that the short-circuiting line, prior to activation of the bypass 61, still provides for a charging, this must then be discharged by means of the symmetrizing unit 71. When a defective matrix line which, for example, has an excessively high self-discharge, is not bridged over by the bypass 61, then the defective line is reversely charged during a discharging process. This has, as a consequence, that less energy can be withdrawn from the condenser matrix 10. The energy storage 10 can for the above-described method be suitably varied in its dimensions.

Figure 2:
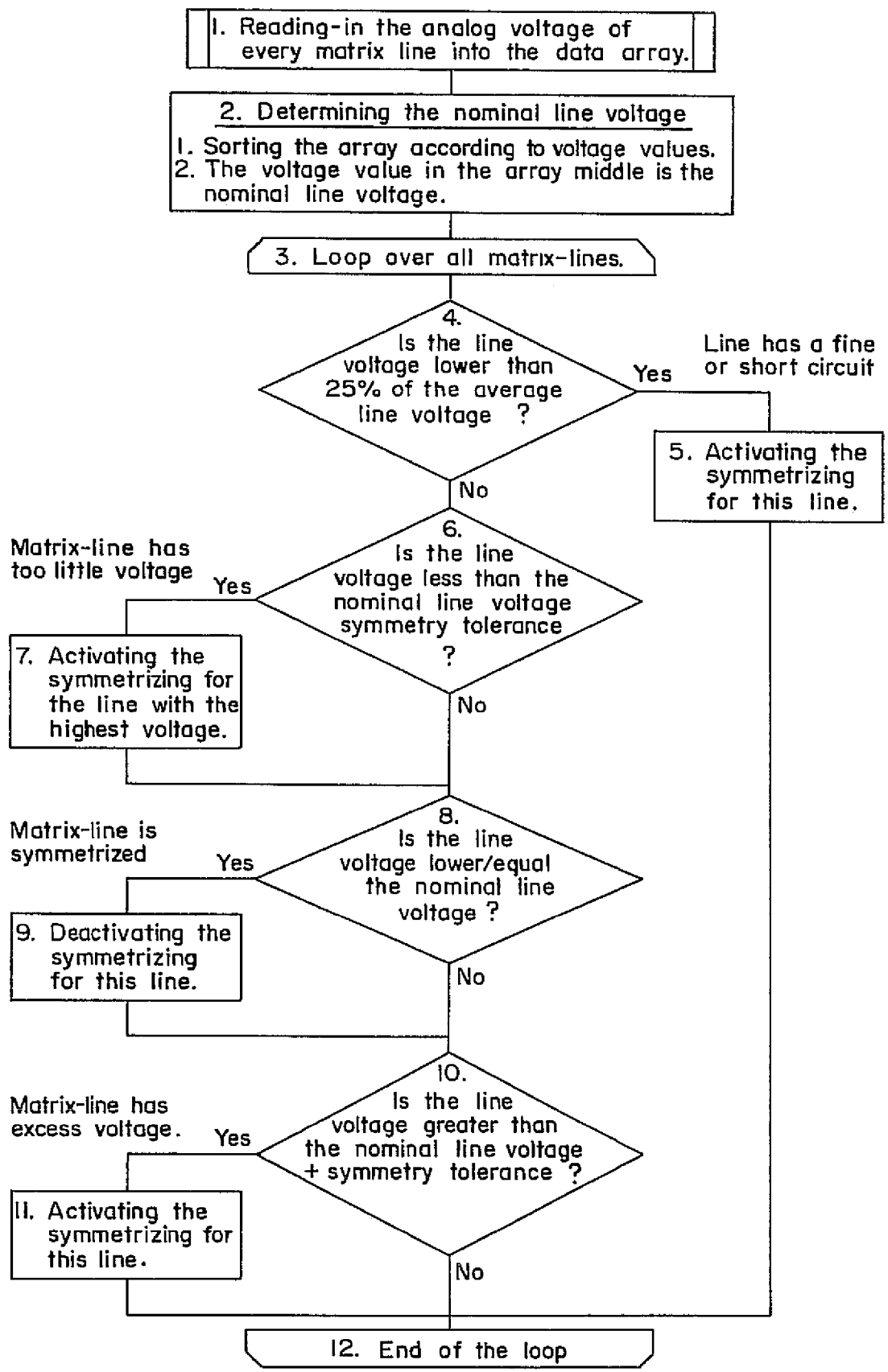
FIG. 2 illustrates a first flow diagram of a method for symmetrizing the condenser matrix of FIG. 1.

FIG. 2 illustrates a flow diagram, which represents at least a portion of a process cycle for symmetrizing, which for example, is stored in the form of a computer program in the microcontroller 100, or which can be constructed fixedly wired in an Application Specific Integrated Circuit (ASIC).

In a first method step, the analog voltages of every matrix line are read into a data array of the microcontroller 100. In a following second method step, there is determined a nominal line voltage, in that the values of the array are sorted in accordance with voltage values, and thereafter, the voltage value in the middle of the array is associated to the nominal line voltage. In contrast with a median value formation, by means of this method step there is prevented that defective lines will have any significant influence over the nominal line voltage.

In a third step, there now begins a loop extending over all lines of the matrix. In this loop, in step four, the actual considered line voltage is compared with a fraction, especially with one-fourth of the average line voltage. When the actual line voltage is hereby lower than the fraction, then the symmetrizing for this line is activated in step five, since for this line there can be assumed a precision circuit or a short-circuit. For activation, the transistor $M_S$ is actuated so that a current will flow across the resistances R and the transistor $M_S$, which are connected in parallel with the line.

When in contrast therewith the line voltage is higher than that fraction of the average line voltage, then in step six, there is carried out a further interrogation. If in this step six the actual line voltage is lower than the difference from the nominal line voltage in a predeterminable symmetry tolerance, then in step seven, there is activated the symmetrizing for the line with the highest voltage. After step six or, when applicable, after step seven, there is carried out a further interrogation in step eight.

When in step eight the line voltage of the actual line is lower than or equal to the nominal line voltage, then in step nine, there is deactivated the symmetrizing of this line. For deactivation, the associated transistor $M_S$ blocks. Subsequently, there is carried out a further interrogation in step ten.

In step ten, the actual line voltage is compared with the sum obtained from the nominal line voltage and a symmetrizing tolerance. If the actual line voltage is higher, then in step eleven, there is effected an activation of the symmetrizing for this line. Step twelve forms the end of the loop. Prior to a renewed interrogation in the steps four, six, eight and ten, there is preferably renewedly read in the analog voltages of every matrix line into the data array and the nominal line voltage is determined (steps one and two).

Figure 3:
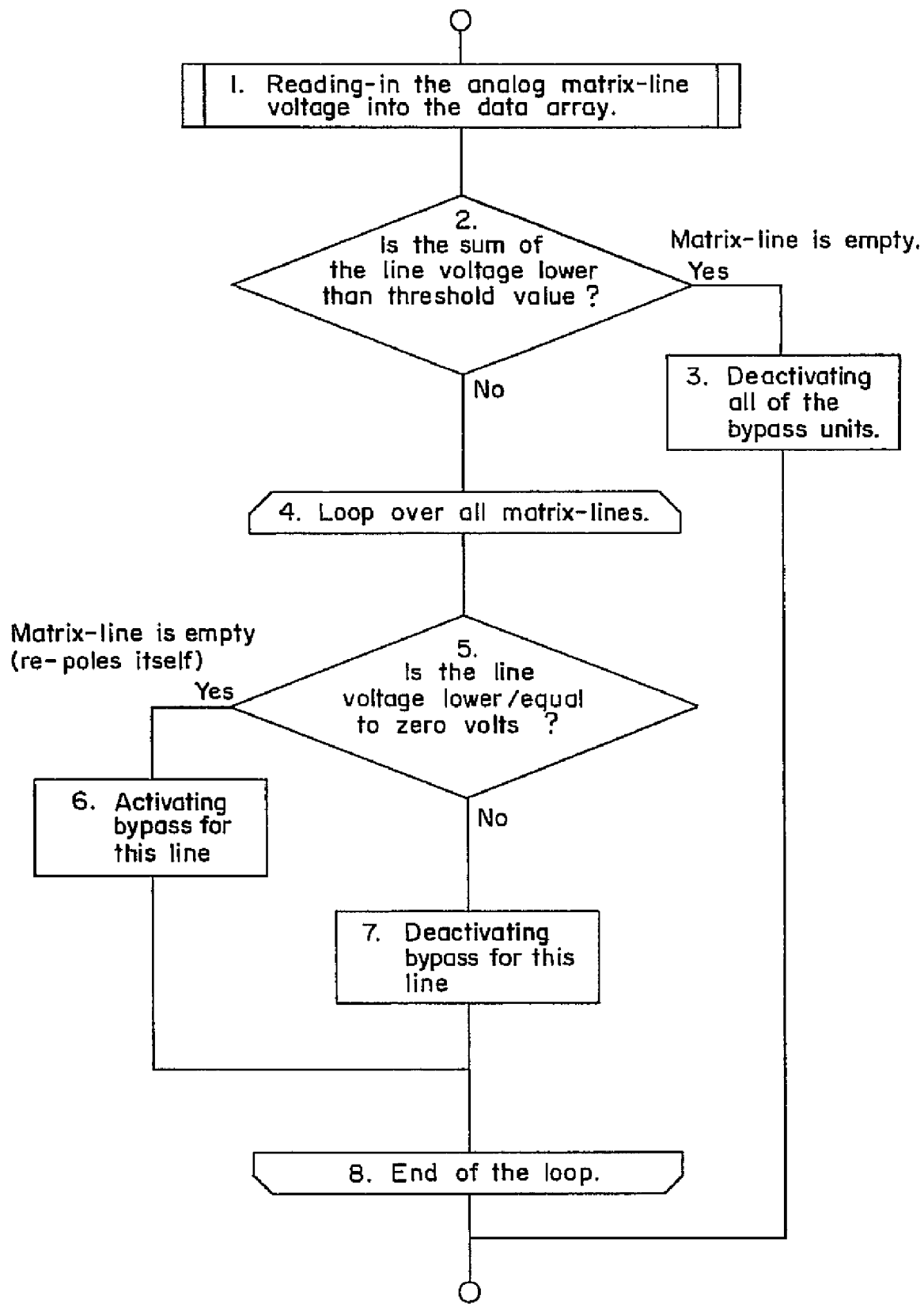
FIG. 3 illustrates a second flow diagram of a method for the deactivating of capacitances of the condenser matrix of FIG. 1.

FIG. 3 illustrates a cycle diagram of the bypass functionality, which facilitates the deactivation of a matrix line. In a step one, there are initially read in the analog voltages of all matrix lines into a data array. Thereafter, in step two, there is interrogated as to whether the sum of all line voltages is lower than a threshold value. Depending upon conditions, all bypass units 16 are deactivated in step three, since there can be deduced therefrom that the condenser or matrix 10 no longer possesses a sufficient energy for the therewith associated operability and is thereby essentially emptied. When the sum of the line voltage, in contrast therewith, is higher than the threshold value, then in step four, there commences a loop over all lines of the matrix 10.

Within the loop, in step five, there is interrogated as to whether the actual line voltage is lower or equals zero (volt). In an affirmative case there can be assumed therefrom that this line of the matrix no longer possesses a charge and can be poled with a further discharge current or further negatively charged. The negative charging of a condenser line does not only results in a reduction of the available energy, but also in a reduction of the terminal voltage, which stands available at the output of the energy storage. As a result thereof, in step six, there is activated the bypass 61 for this line. When the line voltage, in contrast therewith, is greater than zero, then in step seven, the bypass 61 is deactivated, insofar that this was previously activated. Thereafter, in step eight, there is provided the end of the loop.

The invention claimed is:

1. A method for monitoring and controlling a plurality of series-connected capacitances, comprising:
   continuously determining a voltage of every capacitance at least during a discharge of said capacitances; and comparing the voltage thus determined with a first threshold voltage, and, during discharge of said capacitances;
   bridging over at least one said capacitance to the end of the discharge in an instance of a drop-off of the voltage of said at least one of the capacitances below the first threshold voltage;
   wherein for effectuating a symmetrizing of the voltages of the capacitors, continuously determining a voltage of every capacitance at least during a charging of said capacitances;
   comparing the voltages thus determined to a second threshold voltage; and during charging of said capacitances,
   connecting, in parallel with a capacitance having the highest voltage, a resistance R in an instance of a drop-off of the voltage of one of the capacitances below the second threshold voltage.

2. A method according to claim 1, wherein a switch implements the bridging over of said capacitances.

3. A method according to claim 1, wherein in the instance of an exceeding of the voltage of one of the capacitances above a third threshold voltage, said capacitances have a resistance R connected in parallel therewith.

4. A method according to claim 3, wherein the second threshold voltage and/or the third threshold voltage are determined in dependence upon the voltages of all of said capacitances.

5. A method according to claim 4, wherein said threshold voltages are determined in dependence upon the sum of the voltages of all of said capacitances.

* * * * *